United States Patent
Schmit et al.

(10) Patent No.: US 10,487,430 B2
(45) Date of Patent: Nov. 26, 2019

(54) WATER EXTRACTION FACILITY

(71) Applicant: ANDRITZ PERFOJET SAS, Montbonnot (FR)

(72) Inventors: Laurent Schmit, Le Versoud (FR); Alain Planet, Barraux (FR)

(73) Assignee: ANDRITZ PERFOJET SAS, Montbonnot (FR)

( * ) Notice: Subject to any disclaimer, the term of this patent is extended or adjusted under 35 U.S.C. 154(b) by 187 days.

(21) Appl. No.: 15/536,913

(22) PCT Filed: Dec. 16, 2015

(86) PCT No.: PCT/EP2015/080095
§ 371 (c)(1),
(2) Date: Jun. 16, 2017

(87) PCT Pub. No.: WO2016/097055
PCT Pub. Date: Jun. 23, 2016

(65) Prior Publication Data
US 2017/0350053 A1  Dec. 7, 2017

(30) Foreign Application Priority Data
Dec. 17, 2014 (FR) ...................................... 14 02885

(51) Int. Cl.
*F26B 3/00* (2006.01)
*D06B 15/04* (2006.01)
*F26B 13/30* (2006.01)
*F26B 21/00* (2006.01)
*B01D 45/12* (2006.01)
*D06B 15/09* (2006.01)

(52) U.S. Cl.
CPC ............. *D06B 15/04* (2013.01); *B01D 45/12* (2013.01); *F26B 13/30* (2013.01); *F26B 21/004* (2013.01); *D06B 15/09* (2013.01)

(58) Field of Classification Search
CPC ........ F26B 13/30; F26B 21/004; F26B 21/02; D06B 15/04; D06B 15/09; B01D 45/02
USPC ..................................... 34/452, 444, 443, 92
See application file for complete search history.

(56) References Cited

U.S. PATENT DOCUMENTS

| 4,359,826 A | * | 11/1982 | Rounsley | D21F 5/00 |
| | | | | 219/775 |
| 4,901,449 A | * | 2/1990 | Wimberger | B65H 23/24 |
| | | | | 34/641 |
| 5,548,905 A | * | 8/1996 | Kuma | F26B 5/12 |
| | | | | 34/92 |
| 7,721,464 B2 | * | 5/2010 | Hada | D21F 5/182 |
| | | | | 162/307 |

(Continued)

FOREIGN PATENT DOCUMENTS

| CH | 615 713 | 2/1980 |
| DE | 1 635 113 | 3/1971 |

(Continued)

*Primary Examiner* — John P McCormack
(74) *Attorney, Agent, or Firm* — Renner Kenner Greive Bobak Taylor & Weber

(57) ABSTRACT

A water extraction facility comprising a suction box having a suction opening and a chamber (9) arranged above the suction opening by means of a connector (21) and a perforated sheet metal element (24) creating head loss is mounted in the connector (21).

12 Claims, 5 Drawing Sheets

(56) References Cited

U.S. PATENT DOCUMENTS

| | | | |
|---|---|---|---|
| 2004/0099393 A1* | 5/2004 | Jewitt | D21F 5/181 |
| | | | 162/207 |
| 2004/0181966 A1* | 9/2004 | Klerelid | B65H 19/28 |
| | | | 34/618 |
| 2005/0072023 A1* | 4/2005 | Hada | D21F 5/182 |
| | | | 34/633 |

FOREIGN PATENT DOCUMENTS

| EP | 0 056 846 A2 | 10/1981 |
|---|---|---|
| EP | 0 853 156 A2 | 7/1998 |

* cited by examiner

WATER EXTRACTION FACILITY

It is known in the paper, fabric and non-woven materials industry to apply a depression either directly or through a permeable supporting conveyer in order to extract some of the water or humidity contained in these products.

In CH 615 713 A5 a water extraction facility is described that comprises a suction box having a suction opening and communicating via a conduit with a separator that separates air from water. The top part of the separator communicates via pipework on which is mounted a vacuum pipe with a diffusion chamber disposed above the suction opening and opening out towards the latter via a connector.

It has been observed that the distribution of the dehumidification over the width leaves plenty to be desired and that the non-woven cloth is often contaminated. Furthermore, the facility has to be cleaned frequently.

The invention overcomes these disadvantages by means of a water extraction facility according to claim 1.

By creating head loss by means of the perforated sheet metal element, homogeneous distribution of the flow of air over the width is ensured.

Sufficient head loss is created when the void fraction of the perforated sheet metal element is preferably between 10 and 40%, preferably from 18 to 22%. The void fraction is defined by the ratio of the open surface of the sheet metal element to the total surface of the sheet metal element. The sheet metal element preferably has a thickness of from 1 to 4 mm. The perforations preferably have a diameter of 2 to 8 mm and, better, of 2.8 to 3.2 mm.

The oblong connector, like the chamber, is clamped to a channel in which a honeycomb bundle is mounted, the dimension of the cells of said honeycomb bundle being greater than that of the perforations of the perforated sheet metal element with a length of 30 to 100 mm, preferably of 40 to 60 mm, and the equivalent diameter of a cell being between 3 and 10 mm, preferably between 4 and 6 mm. The equivalent diameter D is calculated by $$D = \frac{4S}{P}, S$$

being the section of the cell and P being the perimeter of the cell. The cells preferably have a hexagonal cross-section. Very preferably, the equivalent length/D of the honeycomb>10. The honeycomb bundle makes it possible to orientate the flow parallel to the direction of the channel and to thus maximise the transfer of diffusion air to the suction box. However, the contaminating particles coming from heaps of fibres released by the fan contaminate the honeycomb and cause flow homogeneity problems as the honeycomb becomes clogged up. The perforated sheet metal element also plays a filtration role by avoiding contamination of the honeycomb bundle and of the non-woven cloth. In this function the perforated sheet metal element (upstream in the direction of the passage of air) is covered with a metallic web that has a void fraction of between 25 and 50% and a thickness of between 0.5 and 2 mm and of which one dimension of the perforations is smaller than those of the perforated sheet metal element and is between 0.1 and 1 mm (this dimension being in particular the diameter), and this ensures even better filtration. The honeycomb bundle is preferably supported by another perforated sheet metal element that has a void fraction greater than 40%, in particular from 40% to 60%.

One thus obtains a uniformly dried product at the outlet of the facility and in particular if the facility has the following features:

if one calls Se the inlet section of the chamber (9), if one calls S1 the section of the connector 21 (=section of the passage of fluid through the perforated sheet metal element and through the web), S2 the outlet section of the channel 27 and K the head loss coefficient created by the perforated sheet metal element and web assembly, one has $$S1^2/(K*Se^2)<0.1$$

one has:

$$S1^2/(K*Se^2)<0.03$$

$$S2=(0.5 \text{ to } 1.5)*S1$$

one has:

$$S2=S1$$

if one calls S3 the section of the passage of fluid through the opening (3) of the suction box (4), one has:

$$S2=(3 \text{ to } 10)*S3$$

The head loss coefficient K is measured and defined as follows:

Measurement:

The static pressure P1 is measured just upstream of the perforated sheet metal element+web assembly.

The static pressure P2 is measured just downstream of the perforated sheet metal element+web assembly.

The temperature T is measured upstream of the perforated sheet metal element+web assembly.

The throughput Q that is circulating through the perforated sheet metal element+web assembly is measured.

This measurement can be made by measuring, for example, the air speeds over the outlet section of the diffuser (speed map). Throughput=outlet section*average speed over the outlet section.

Another way of measuring throughput: by means of the performance curves of the fan which circulates the air within the diffusion chamber.

If one knows the static pressures just upstream and downstream of the fan, and if one also knows the power consumed by the fan motor, one can easily deduce from this the throughput by means of the performance curves of the fan.

Definition:

Coefficient K is given by the following formula:

$$K=(Ro*V^2)/(2*(P1-P2))$$

With Ro, fluid density upstream of the perforated sheet metal element=P1/(287*T)

V=Q/S1, with S1—fluid passage section in the perforated sheet metal element+web assembly.

Units:

Q in M3/s

V in m/3 s

S1 in m²

P1 and P2 in Pa

Ro in kg/m3

T in Kelvin

K without any unit.

It is now the perforated sheet metal element that clogs up the quickest. This is why, according to one embodiment of the invention, provision is made to mount it in a removable drawer which preferably has a handle on the outside of the connector. In order to replace the perforated sheet metal element it is no longer necessary to unclamp the connector from the channel. It is sufficient to pull out the draw in which the perforated sheet metal element is mounted, to take the perforated sheet metal element out of the drawer, to clean it, and then put it back in the drawer or put a new one in and reposition the drawer within the connector. Maintenance of the facility is greatly facilitated.

In the attached drawings, given purely as examples:

Figure 1:
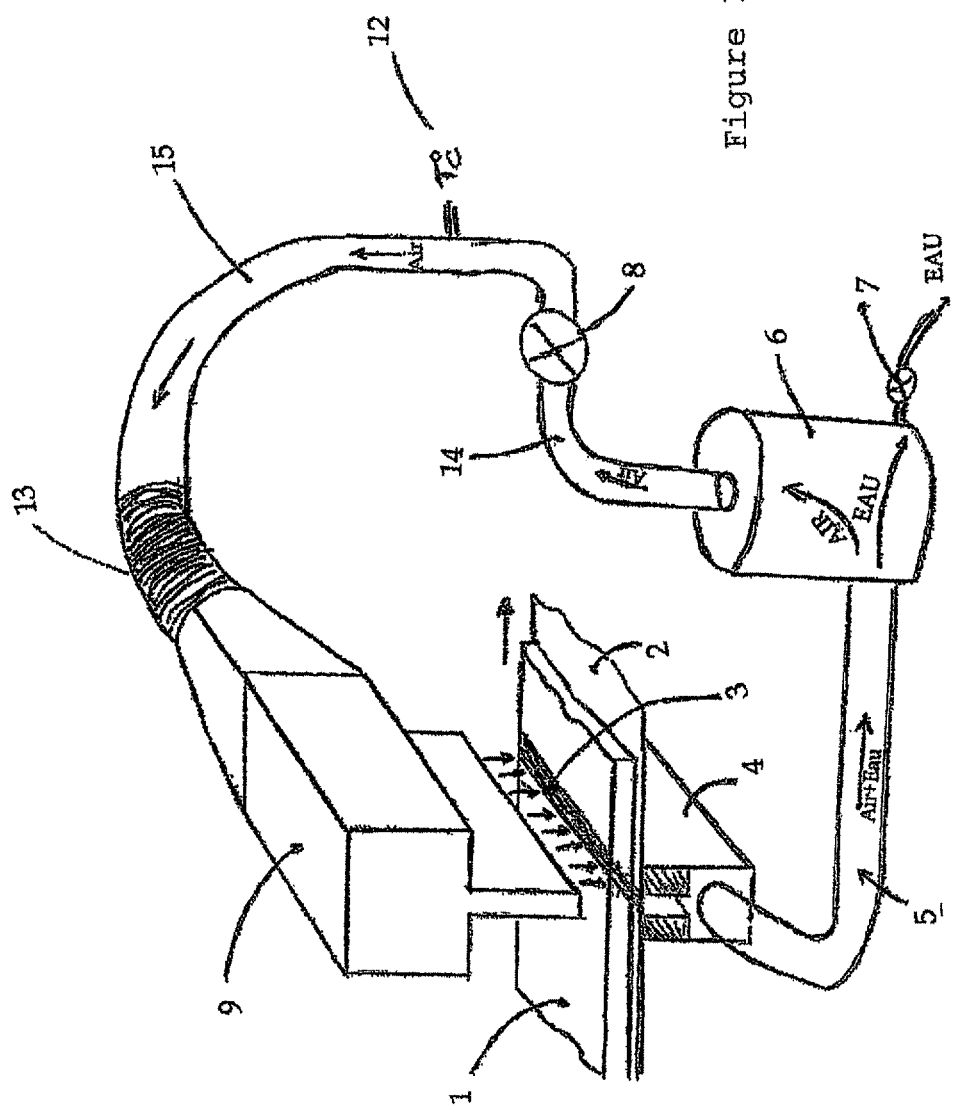
FIG. 1 illustrates the facility according to the invention.

The non-woven fabric, saturated with water 1, set in motion by the conveyor web 2, passes above the suction opening 3. The void (−400 to −500 mbar) created in the suction box 4 by the vacuum pump 8 generates an air current through this opening which passes through the non-woven fabric 1+conveyor web 2 assembly, carrying with it some of the water contained in the non-woven fabric 1.

The air/water mixture which is thus formed is evacuated by pipework 5 to the separator 6.

The role of the separator 6 is to separate the air and the water by a cyclonic effect:
  in the bottom part the water is evacuated by a pump 7 to the filtration circuit or a drain,
  in the top part, i.e. above the air and water separation level, the air is evacuated by a vacuum pump 8 through the pipework 14.

As it passes through the vacuum pump 8, the current of air heats up to a temperature measured by a thermometer 12 and is then carried to a diffusion box 9 by pipework 15, then by a hose 13.

The diffusion box will diffuse the hot air homogeneously above the suction opening 3.

Figure 2:
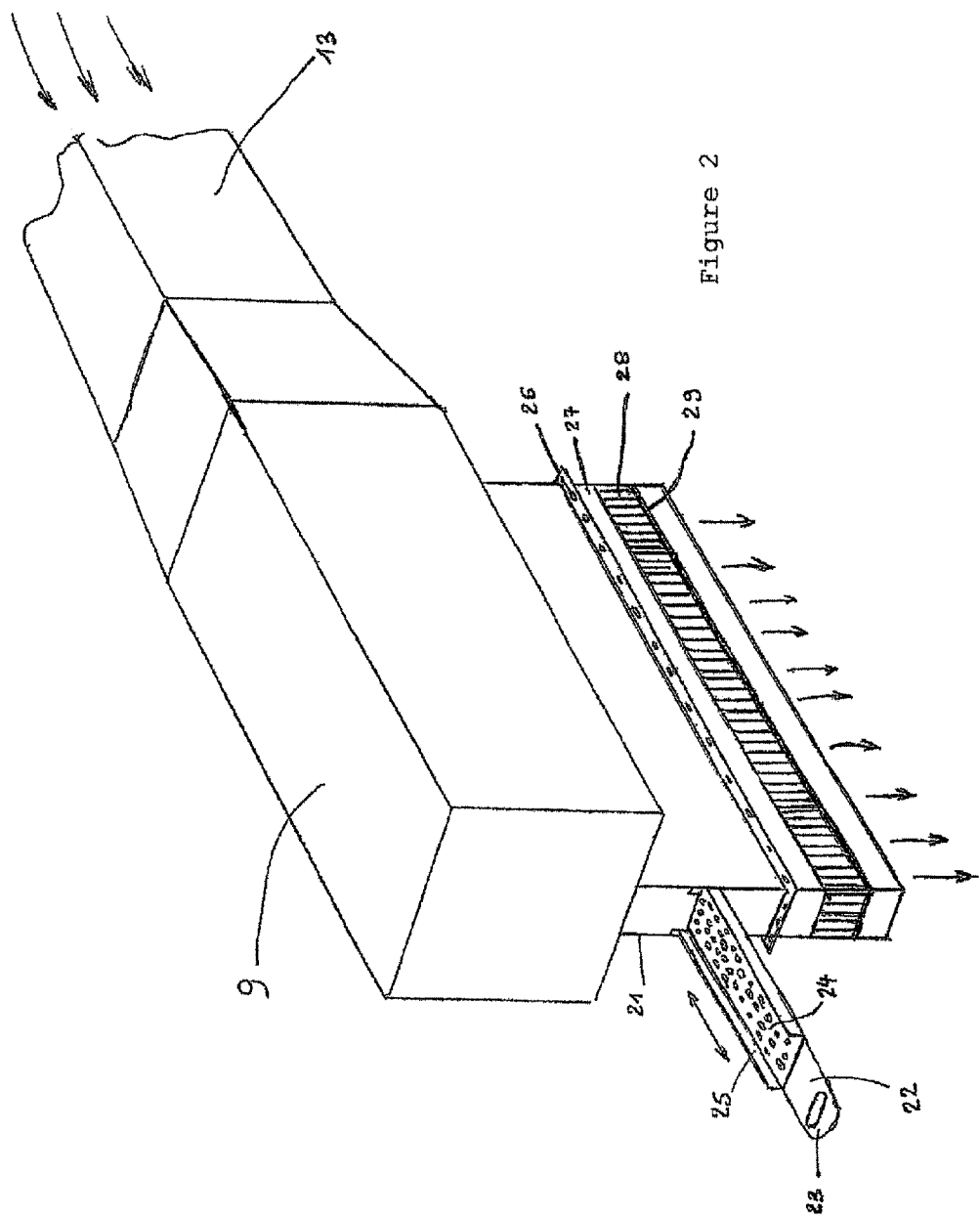
FIG. 2 is a perspective view of the diffusion box wherein the perforated sheet metal element is shown without being covered by the metallic web.
Figure 2A:
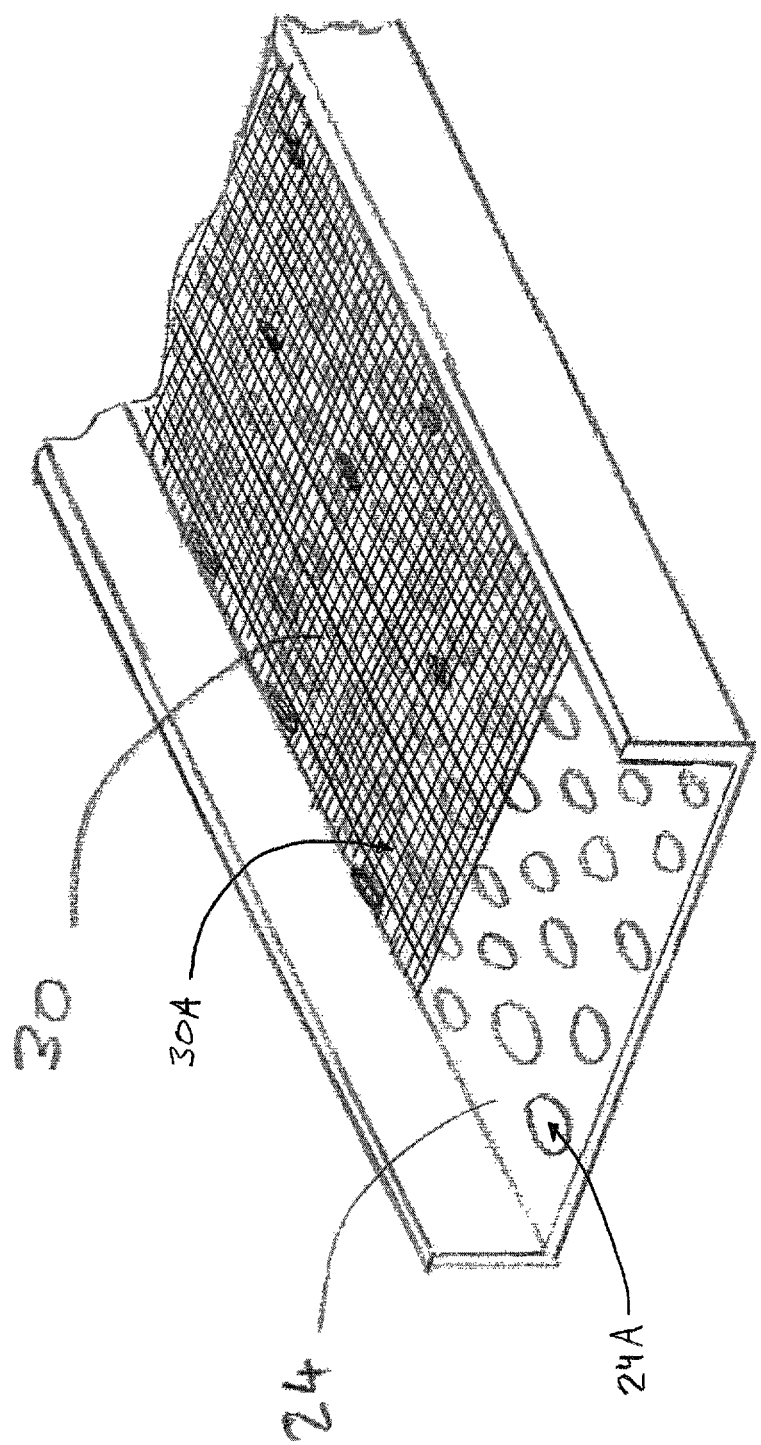
FIG. 2A is a perspective view of the perforated sheet metal element covered by the metallic web.
Figure 3:
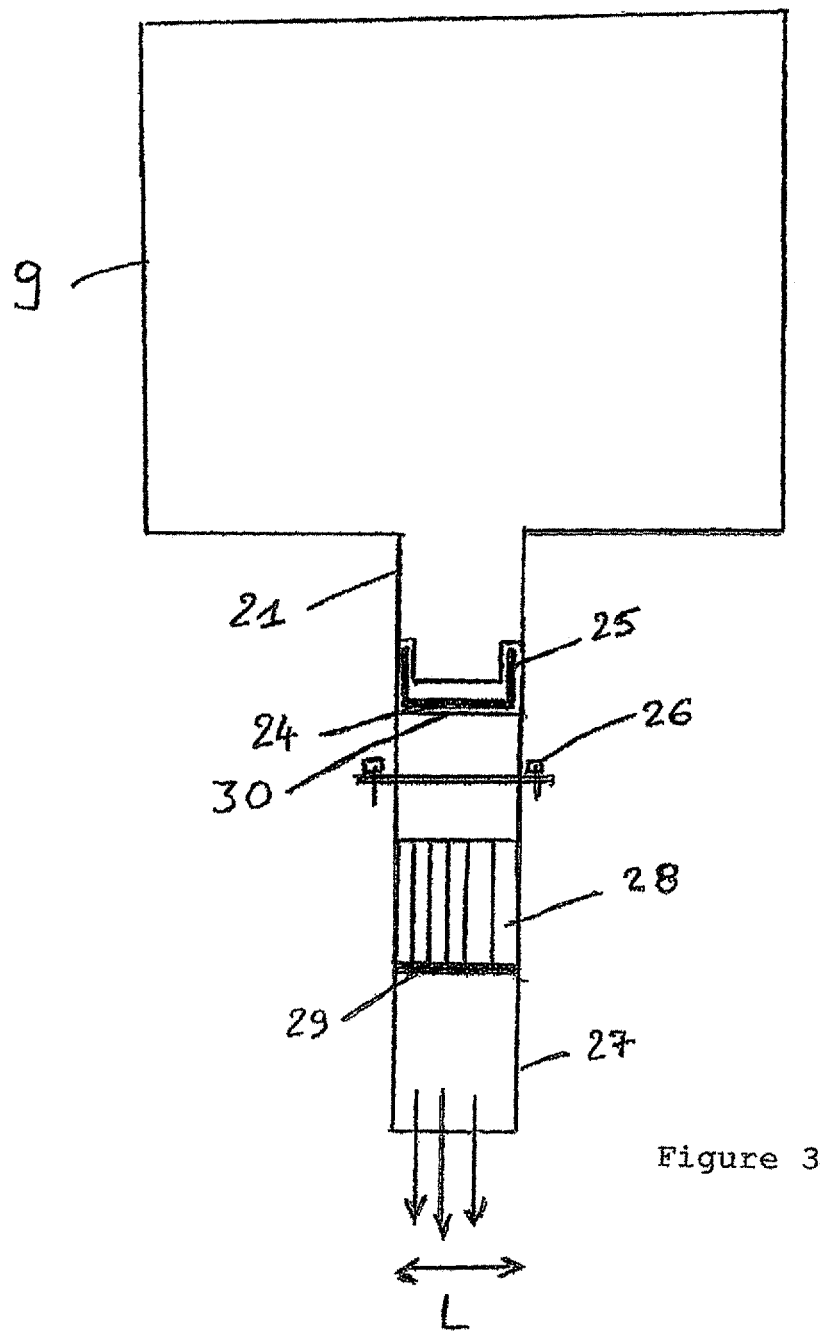
FIG. 3 is a front view.

The diffusion box shown in FIGS. 2, 2A and 3 comprises a chamber 9 which is, for example, parallelepipedic and has two front faces, one of which is closed and the other of which, with a section Se, receives the hose 13. A parallelepipedic connector 21 of the same length as the chamber leaves the large lower face. The chamber 9 is 200 to 500 mm wide. The width L1 of the connector 21 is 40 to 60 mm. Its named section is S1. Mounted in this connector 21 is a sliding drawer 22 which has a handle 23 and carries a perforated sheet metal element 24, which has perforations 24A, that has a degree of openness of 10 to 40%. The drawer 22 slides in the connector 21 by means of runners 25. The perforated sheet metal element 24 is covered in a fine metallic web 30 which has a void fraction of between 25 and 50 and a diameter of the openings or perforations 30A of 0.5 mm. The web 30 is upstream of the sheet metal element 24 in the direction of the passage of air.

A channel 27 is clamped, by flanges 26, to the connector 21, in which channel is mounted a honeycomb bundle 28 with section S2, S2=L*L2, with L=diffusion zone length=width of the machine and L2=width of the section at the bundle 28 outlet, supported by a perforated sheet metal element 29 that has a void fraction of 40 to 60%. The cells of the honeycomb bundle 28 have a dimension of 4 to 10 mm.

If one calls Se the inlet section in the chamber. If one calls S1 the connector 21 section (=section of the passage of fluid through the perforated sheet metal element 24 and through the web 30), S2 the channel 27 outlet section, S3 the section of the passage of fluid through the opening (3) of the suction box (4) and K the head loss coefficient created by the perforated sheet metal element 24 and web 30 assembly, one preferably has $S1^2/(K*Se^2)<0.03$ and S2=S1 and S2=6*S3.

Figure 4:
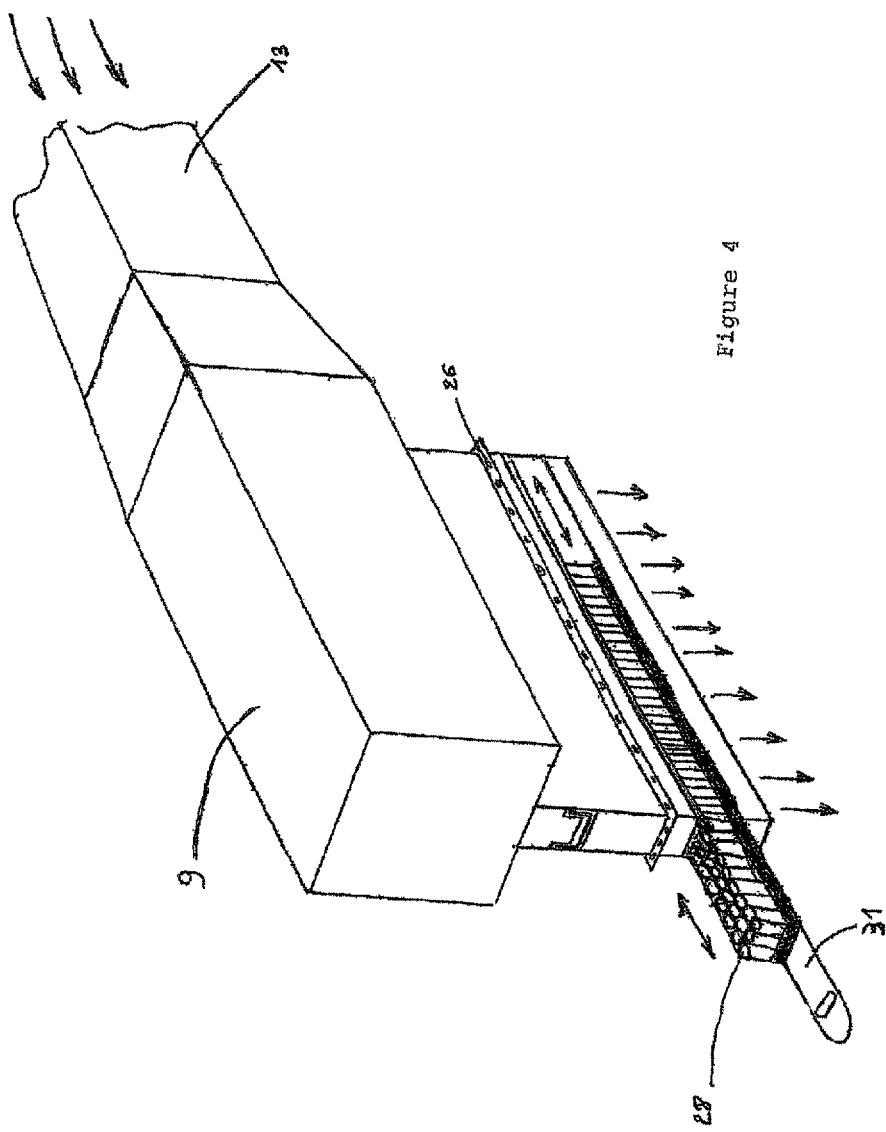
FIG. 4 is a perspective view of another diffusion box.

FIG. 4 is a view similar to FIG. 2 of a diffusion box in which the honeycomb bundle 28 is mounted on a removable drawer 31.

The invention claimed is:

1. A water extraction facility comprising a suction box (4) having a suction opening (3) and communicating via a conduit (5) with a separator (6) separating air from water and having a top part, the top part of the separator (6) communicating via pipework (14, 15), on which is mounted a vacuum pump (8), with a chamber (9), disposed above the suction opening (3) and opening out towards the suction opening (3) via a connector (21), characterized in that
  a perforated sheet metal element (24) creating head loss and having first perforations is mounted in the connector (21),
  the connector (21) is clamped to a channel (27) in which is mounted a honeycomb bundle (28) with cells, the dimension of the cells of said honeycomb bundle being greater than that of the first perforations of the perforated sheet metal element (24), and
  the perforated sheet metal element (24) is covered with a metallic web (30) that has a void fraction of between 25 and 50% and that has second perforations of which one dimension is smaller than those of the first perforations of the perforated sheet metal element.

2. The facility according to claim 1, characterized in that the void fraction of the perforated sheet metal element (24) is between 10% and 40%.

3. The facility according to claim 1, characterized in that one dimension of the second perforations of the web is between 0.1 and 1 mm.

4. The facility according to claim 1, characterized in that $S1^2/(K*Se^2)$ is less than 0.1,
  wherein the chamber has an inlet section represented by the symbol Se,
  wherein the connector is represented by the symbol S1, wherein S1 equals the section of the passage of fluid through the perforated sheet metal element and through the web,
  wherein the channel has an outlet section represented by the symbol S2, and
  wherein a symbol K equates to the head loss coefficient created by the perforated sheet metal element and the web.

5. The facility according to claim 4, characterized in that the formula $S1^2/(K*Se^2)$ is less than 0.03.

6. The facility according to claim 4, characterized in that S2 equals (0.5 to 1.5)*S1.

7. The facility according to claim 6, characterized in that S2 equals S1.

8. The facility according to claim 4, characterized in that if S3 equals the section of the passage of fluid through the suction opening (3) of the suction box (4), then S2 equals (3 to 10)*S3.

9. The facility according to claim 1, characterized in that the bundle (28) is supported by another perforated sheet metal element (29) that has a void fraction greater than 40%.

10. The facility according to claim 1, characterized in that the perforated sheet metal element (24) is mounted in a removable drawer (22).

11. The facility according to claim 1, characterized in that the bundle (28) is mounted in a removable drawer.

12. The facility according to claim 2, characterized in that one dimension of the second perforations of the web is between 0.1 and 1 mm.

\* \* \* \* \*